United States Patent

Scott

[15] 3,641,407

[45] Feb. 8, 1972

[54] INDUCTOR SURGE PROTECTION FOR TRANSISTORS

[72] Inventor: Richard D. Scott, Chicago, Ill.

[73] Assignee: Teletype Corporation, Skokie, Ill.

[22] Filed: Oct. 26, 1970

[21] Appl. No.: 84,041

[52] U.S. Cl. ................................317/43, 307/202, 307/237, 317/DIG. 6

[51] Int. Cl. ..........................................................H02h 7/20

[58] Field of Search....................317/DIG. 6, 43, 33; 307/89, 307/90, 92, 104, 101, 202, 318, 237, 270

OTHER PUBLICATIONS

IBM Technical Disclosure Bulletin, vol. 6 no. 1 June 1963

[56] References Cited

UNITED STATES PATENTS 3,340,407 9/1967 Sinclair................................307/93 X

*Primary Examiner*—Gerald Goldberg
*Assistant Examiner*—Harvey Fendelman
*Attorney*—J. L. Landis and R. P. Miller

[57] ABSTRACT

A circuit for clamping a voltage induced across an inductor utilizes a Zener diode to control the energy dissipation of the inductor through a transistor. A driver circuit for an inductor includes a Zener diode and an opposing diode connected across the series combination of the base-emitter junction of an emitter-follower output transistor and the inductor driven thereby. When the transistor is conducting, the inductor is energized and no current flows through the Zener diode. When the transistor is caused to cease conduction, the field of the coil of the electromagnet collapses, generating a voltage that is applied to the emitter of the output transistor. If the voltage thus generated is greater than the Zener breakdown voltage, the Zener diode breaks down and provides a bias current to the base of the output transistor to permit further conduction of the transistor and clamps the voltage at the emitter of the transistor to substantially the value of the Zener breakdown voltage. The voltage generated by the inductor is thus prevented from applying too high a voltage across the collector-emitter circuit of the output transistor, which might damage the transistor. The transistor continues to conduct during the dissipation of the energy stored in the inductor until the inductor is almost fully deenergized and can no longer generate a voltage equal to the Zener diode breakdown voltage. The output transistor is then rendered nonconductive, completing the deenergization of the inductor.

17 Claims, 3 Drawing Figures

PATENTED FEB 8 1972 3,641,407

INVENTOR
RICHARD D. SCOTT
BY William G. Dossé
ATTORNEY

INDUCTOR SURGE PROTECTION FOR TRANSISTORS

BACKGROUND OF THE INVENTION

1. Field of the Invention

The invention is concerned with driving circuits for inductors and, more particularly, with a circuit and method for protecting a transistor having an inductive load from possible damage from the induced voltage surge associated with the collapsing field of the inductive load when the transistor is caused to undergo a change from a conducting to a nonconducting state. Inductor drivers are useful in numerous types of electronic equipment including printing telegraph machines for controlling the operation of printing magnets or the like.

2. Description of the Prior Art

When a transistor having an inductive load is selectively switched from a conducting to a nonconducting state, the sudden reduction of current through the inductor causes its magnetic flux field to collapse and produces a back electromotive force of voltage thereacross of such polarity as to generate a current to oppose the changing flux. This voltage is capable, in many cases, of damaging the transistor and other circuit components.

One known method of controlling the voltage rise in a deenergized inductor is to connect additional components, such as an R–C series circuit, in parallel with the inductor to limit the transient voltage appearing across the transistor to a value below the breakdown voltage thereof.

Another known method of protecting the transistor from the voltage induced by the collapsing magnetic field is to provide a constant-voltage shunt path across the inductor. The shunt path across the inductor may include a Zener diode and a conventional diode connected in series opposing relationship such that the normal driving current to operate the inductor is blocked by the conventional diode and thus directed through the inductor. Upon cutoff of the driving current, the voltage buildup of the inductor breaks down the Zener diode to permit dissipation of the stored energy of the inductor until this stored energy decays to a level insufficient to generate a voltage equal to the breakdown voltage of the Zener diode. Such a circuit, however, requires a Zener diode directly able to withstand the high energy dissipated by the collapsing magnetic field of the inductor.

Still another known method of controlling the voltage rise in a deenergized inductor is to connect the inductor in the collector circuit of the transistor and to connect a Zener diode, having a breakdown voltage greater than the supply voltage, between the collector and the base of the transistor. When the inductive voltage buildup reaches the maximum value desired, the Zener diode breaks down and provides a bias current to the base of the transistor that is sufficient to cause the transistor to conduct through its collector the bulk of the current from the inductor during its deenergization. Therefore, the Zener diode need not withstand the high energy dissipated by the collapsing magnetic field of the coil but only sufficient energy to provide the transistor with base current. However, each such transistor requires an individual, costly Zener diode which can be an undesirable feature if a large number of such inductor-energizing transistors are used in a single installation.

In addition, the discharge voltage of the inductor is the difference between the Zener diode voltage and the supply voltage. Both of these voltages are subject to tolerances, and the difference between them is therefore subject to a tolerance which is the sum of their individual tolerances. This is particularly undesirable when trying to maintain uniformity of inductor discharge voltage.

It is an object of the present invention to provide for the protection of a driving transistor having an inductor in its load circuit against the high induced voltage associated with the collapsing field of the inductor when the transistor is biased to undergo a change from a conductive to a nonconductive state.

It is an additional object of the invention to utilize a relatively low-power Zener diode having a breakdown voltage lower than the supply voltage to control the high energy dissipation of an inductor connected in the load circuit of a transistor.

It is a further object of the invention to control the high voltage rise of an inductor in the load circuit of a transistor by dissipating the stored electromagnetic energy of the inductor in the transistor itself without additional components having high-current capability.

It is another object of the present invention to control the discharge of a plurality of transistor-energized inductors by maintaining the energizing transistors in a transient conductive state in response to a single voltage reference.

It is still another object of the present invention to discharge more than one inductor uniformly.

SUMMARY OF THE INVENTION

With these and other objects in view, the present invention contemplates controlling the induced potential associated with the dissipation of the energy in a magnetic field around an inductor connected to the emitter of a conducting transistor to avoid damage to the transistor when the transistor is subsequently rendered nonconductive by: (1) clamping the emitter of the transistor to a predetermined limiting value of induced potential to forward bias the transistor and provide a current path through the transistor for the induced inductor current; and (2) removing the forward-bias when the inductor can no longer generate the predetermined potential.

The needed control is provided by a Zener diode connected across the series combination of the base-emitter junction of the transistor and the inductor. When the transistor tends to undergo a change from a conducting to a nonconducting state, the voltage applied across the inductor is turned "off" and the inductor generates an induced voltage which rises above the level of the previous applied voltage and breaks down the Zener diode which acts to clamp the transistor into a temporary conducting state to permit the stored energy of the inductor to dissipate through the transistor at a constant voltage until the level of current through the emitter of the transistor decays to almost zero. By choosing the Zener breakdown voltage at a value below the collector-emitter breakdown voltage of the transistor, the transistor is protected from any breakdown damage which might be caused by the induced transient voltage of the inductor.

The inductor is connected to the emitter of the transistor in order to permit the use of one Zener diode to provide the predetermined voltage reference for several inductor-driver transistors.

BRIEF DESCRIPTION OF THE DRAWINGS

A more complete understanding of the invention will be obtained from the following detailed description of a specific embodiment thereof, when read in conjunction with the accompanying drawings, wherein.

DETAILED DESCRIPTION

Figure 1:
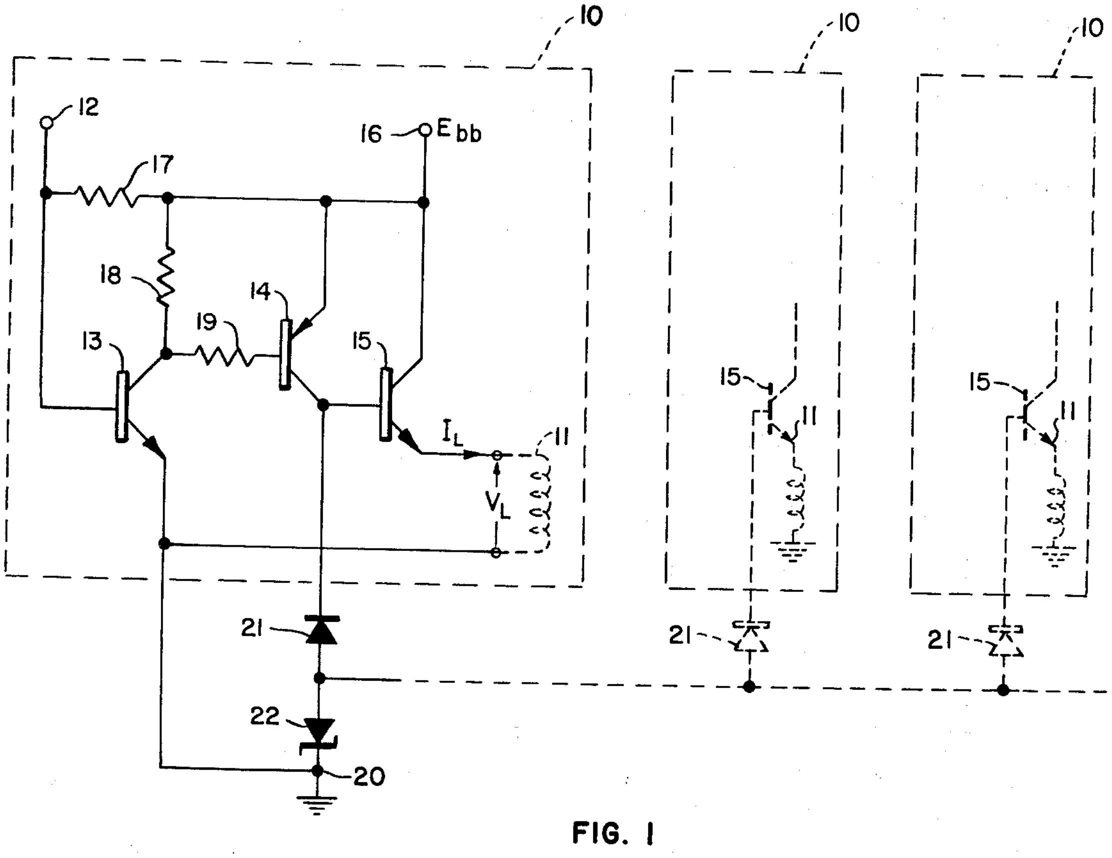
FIG. 1 is a schematic diagram of a driving circuit for an inductor utilizing a Zener diode to control the energy dissipation of the inductor to prevent damage to an output transistor to which the inductor is connected and shows the possible interconnection of several such circuits to a single Zener diode.

Referring to FIG. 1, there is shown an amplifier circuit 10 for driving an inductor 11 in response to the selective application of high or low level signals to an input terminal 12. The amplifier circuit 10 is a two-state, common-emitter type including two transistors 13 and 14, together with an emitter-follower output stage including a transistor 15 having the inductor 11 connected as the load thereof. It will be assumed that the high level signal output response is obtained by the circuit as shown (i.e., an open circuit applied to the terminal 12) and that the low level signal output response is obtained by selectively applying ground potential to the terminal 12.

Figure 2:
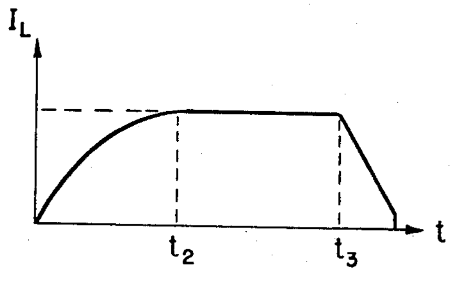
FIG. 2 is a waveform of the driving and induced currents through the inductor of FIG. 1.

When an open circuit is present at the input terminal 12, the transistors 13, 14 and 15 are rendered conductive, and the inductor 11 starts to energize having a current $I_L$ building up therethrough as shown in FIG. 2. The open circuit at the input terminal 12 permits the NPN-transistor 13 to be biased into conduction by a positive DC voltage applied to the base thereof. The baising voltage is supplied by the connection of a positive terminal of a bias battery (not shown) having a value $E_{bb}$ at a terminal 16 across a resistor 17 and the base-emitter junction of the transistor 13.

When the transistor 13 conducts, a current flows through its collector resistor 18. A resistor 19 then conducts current from the collector of the transistor 13 (near ground potential) to the base of the PNP-transistor 14, biasing the transistor 14 into conduction. The resistor 18 assures that the transistor 14 will turn off when the transistor 13 turns off again.

When the transistor 14 conducts, the base-emitter junction of the NPN-output transistor 15 becomes forward biased and is rendered conductive, thereby supplying driving voltage from the terminal 16 to the inductor 11 that is connected between the emitter of the transistor 15 and a common ground terminal 20.

The base electrode of the transistor 15 is also connected to the cathode of a conventional diode 21. A Zener diode 22 is connected in series opposition with the diode 21 between the anode thereof and the ground terminal 20. The diode 21 prevents the base current of the transistor 15 from being bypassed to ground through the Zener diode 22 when the transistor 14 conducts.

Figure 3:
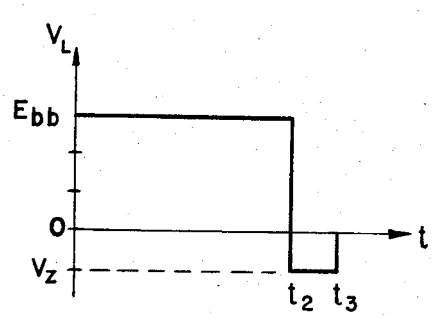
FIG. 3 is a waveform of the voltages across the inductor of FIG. 1 corresponding to the current waveform of FIG. 2, particularly illustrating the effect of the clamping action of the Zener diode.

As shown in FIG. 2, the inductor 11 characteristically initially resists the current $I_L$ therethrough, initially opposing the same with a back electromotive force equal to the total voltage $V_L$ across the inductor which, as shown in FIG. 3, is essentially equal to the supply voltage $E_{bb}$. The current $I_L$ through the inductor 11 gradually increases until it reaches its steady state value at a time $t_1$ when the inductor 11 is fully energized. The steady state current through the inductor 11 is determined by its internal resistance and the applied supply voltage $E_{bb}$. The inductor 11 remains energized as long as the transistor 15 is conductive.

When it is desired to cease operation of the inductor 11 (at a time designated $t_2$), a ground potential is applied to the input of the driving circuit. When ground potential is thus applied to the input terminal 12 of the driver circuit 10, the base of the transistor 13 is grounded, removing the positive bias therefrom and rendering the transistor 13 nonconductive. This causes the potential at the base of the transistor 14 to become more positive approaching the voltage of the terminal 16, thus rendering the transistor 14 nonconductive. When the transistor 14 ceases to conduct, the base of the transistor 15 no longer receives bias current from the transistor 14 and the transistor 15 tends thereby to become nonconductive.

When the transistor 15 thus attempts to turn off, it tries rapidly to reduce the current through the inductor 11. The inductor 11 once again characteristically resists the change of current through it, drawing on the energy stored in the magnetic field surrounding it to maintain the flow of current in the same direction as preceded the attempt by the transistor 15 to turn off. In doing this, a voltage is self-induced across the inductor; and the inductor 11 thus becomes a transient source of electromotive force (voltage).

The voltage induced across the inductor 11 due to the collapsing of its magnetic field appears as a high negative voltage at the emitter of the transistor 15. Without protective circuitry, such a negative voltage at the emitter of the transistor 15 in combination with the positive voltage ($E_{bb}$) appearing at its collector might produce a large enough potential difference between the collector and the emitter of the transistor 15 to break down and possibly damage the transistor. The foregoing situation, however, is effectively prevented by the presence of the Zener diode 22 in the shunt path across the series combination of the base-emitter junction of transistor 15 and the inductor 11.

The breakdown voltage $V_z$ of the Zener diode 22 is of a value chosen to keep the total collector-emitter voltage of the transistor 15 well below its breakdown voltage. When the negative potential at the emitter of the transistor 15 reaches approximately the value of the Zener breakdown voltage $V_z$, The Zener diode 22 breaks down and conducts. The current thus passed through the Zener diode 22 forward biases the base-emitter junction of the transistor 15, thereby turning on the transistor and clamping its emitter to a predetermined limiting value $-V_z$ by forward biasing the base-emitter junction of the transistor 15 enough to conduct the bulk of the current through the inductor 11.

The clamping effect of the Zener diode 22 is best illustrated in FIG. 3. But for the presence of Zener diode 22, the voltage $V_L$ across the inductor 11 would increase negatively without theoretical limit. Because of the Zener diode 22, however, the voltage $V_L$ across the inductor is limited to a value of $-V_z$.

The transistor 15 continues to conduct while the energy stored in the collapsing field of the inductor 11 dissipates until for example, a time $t_3$, when the inductor can no longer produce a voltage $V_z$. The Zener diode 22 thereafter ceases conduction, thus cutting off the transistor 15.

IT can be seen that the discharge voltage of the inductor is determined solely by the breakdown voltage of the Zener diode 22. Therefore, the tolerance inherent in the Zener diode voltage is the only variation to which the inductor discharge voltage is subject.

Because the inductor is connected in emitter circuit of the transistor 15, the diode 21 can be used. Therefore, the breakdown voltage of the Zener diode 22 can be less than the supply voltage $E_{bb}$. This further reduces the level of the power that must be dissipated by the Zener diode.

While a single-output transistor 15 is shown, it will be appreciated that a two-stage emitter-follower output circuit (called a Darlington circuit) can also be used in place of the single transistor 15 in order to obtain increased current gain. In such a case, the cathode of the diode 21 would be connected to the base of the first stage transistor of the Darlington circuit.

By connecting the inductor 11 in the emitter circuit of the output transistor, rather than in its collector circuit, it is possible for the Zener diode 22 to be shared by several inductor driver amplifier circuits 10 as shown in FIG. 1. This is accomplished by connecting the anodes of several other diodes 21 to the anode of the Zener diode 22. Any one of the diodes 21, if forward biased by the voltage induced by its associated inductor 11, could conduct current through the Zener diode 22. However, each diode 21, when back biased, effectively isolates its associated inductor driver circuit 10 from the Zener diode 22 and from the other inductor-driver circuits 10. Therefore, the Zener diode 22 need not cease conduction for the transistor 15 to be cut off. Assuming that the Zener diode were maintained in conduction by some means not shown. The anode of the Zener diode 22 would maintain the anode of the diode 21 at a voltage of $-V_z$. As soon as the inductor 11 could no longer generate a voltage greater than $V_z$, the diode 21 would itself become back biased and thus nonconductive.

Another advantage of using a single Zener diode for several circuits rather than using many Zener diodes—one for each circuit—is that all of the inductors experience exactly the same discharge voltage. This is particularly beneficial in a printing apparatus.

It will be apparent to those skilled in the art that though the invention has been illustrated and described in connection with protecting an output transistor of the NPN conductivity type, a mere reversal of polarities of the diodes 21 and 22 and the bias voltage at terminal 16 would permit the invention to be used with a properly biased transistor of the PNP type. This and other modificatons may be made from the specific details described without departing from the spirit and scope of the invention.

What is claimed is:

1. A method of controlling the induced POTENTIAL associated with the energy dissipation of an inductor connected to a transistor having at least a base and an emitter to avoid damage to said transistor when said transistor is rendered nonconductive, comprising the steps of:

connecting the inductor to the emitter of the transistor;

clamping the base of the transistor to a predetermined limiting value of induced potential to forward bias the transistor and provide a current path for the induced current through said inductor; and removing said forward bias when the induced potential falls below a predetermined value.

2. A method according to claim 1 wherein the clamping is accomplished by:

limiting the potential that can exist at the base of the transistor.

3. A method according to claim 1 further including isolating the transistor from similar transistors after removal of said forward bias.

4. A circuit for controlling the energy dissipation of an inductor connected to a conducting transistor having at least a base and an emitter when said transistor is rendered nonconductive, comprising:

means for connecting the inductor between a voltage reference and the emitter of the transistor;

means connected to the base of the transistor and responsive to the induced voltage across said inductor for forward biasing the base-emitter junction of said transistor to provide a current path for the induced current through said inductor; and means for removing said forward bias when the induced potential falls below a predetermined value.

5. A circuit as set forth in claim 4 wherein said means connected to the base of the transistor includes a Zener diode connected in parallel with the base-emitter junction of said transistor and said inductor.

6. In a circuit for driving an inductor, an output transistor having a base, a collector, and an emitter connected as an emitter follower, the conductor being connected as a load in the emitter circuit of said transistor;

means for rendering said transistor conductive to energize said inductor;

means for rendering said transistor nonconductive to deenergize said inductor whereby said inductor applies a voltage to said emitter; and means responsive to the voltage applied by said inductor to said emitter for clamping the voltage applied to the emitter to a predetermined value insufficient to damage the transistor.

7. In a circuit for driving an inductor as recited in claim 6, wherein said clamping means includes a Zener diode connected inductive load the base of said transistor.

8. An improved circuit for protecting a transistor with at least a base, a collector, and an emitter and having an inductive load from the effect of an increasing potential difference between its collector and emitter when the transistor undergoes a change from a conducting to a nonconducting state and the field of said inductor collapses, wherein the improvement comprises:

means for connecting the inductive load to the emitter of the transistor; and means connected in parallel with the inductor and the base-emitter junction of the transistor and response to an initial increase in potential between said collector and emitter by the induced potential of the inductor for forward biasing the base-emitter junction of said transistor to dissipate the energy of said inductor through said transistor while limiting the potential of the emitter thereof to a predetermined increase in value.

9. A circuit according to claim 8 wherein the inductor is connected between the emitter of the transistor and a reference potential.

10. A circuit according to claim 9 wherein the forward biasing means comprises a Zener diode connected between the reference potential and the base of the transistor.

11. A circuit according to claim 10 further including an isolation diode connected in series with the Zener diode 12. A circuit according to claim 11 wherein the isolation diode is arranged to conduct current in series with the forward-biased base-emitter junction of the transistor.

13. A circuit according to claim 12 wherein the isolation diode is connected between the Zener diode and the base of the transistor 14. A circuit ACCORDING TO CLAIM 13 further including at least one additional diode connected to the Zener diode at its point of connection with the isolation diode.

15. A circuit according to claim 14 further including at least one additional transistor having a base connected to the additional diode.

16. A circuit for protecting a transistor having at least a base and an emitter from the voltage applied by an inductor comprising:

the inductor connected between the emitter of said transistor and a terminal at a reference potential; and a Zener diode connected between the base of the transistor and the terminal.

17. A circuit according to claim 16 further comprising a diode connected between said Zener diode and the base of the transistor.

* * * * *